H. W. EKBERG.
MOTION PICTURE REFLECTION APPARATUS.
APPLICATION FILED JULY 26, 1915.
1,318,269.
Patented Oct. 7, 1919.
5 SHEETS—SHEET 3.
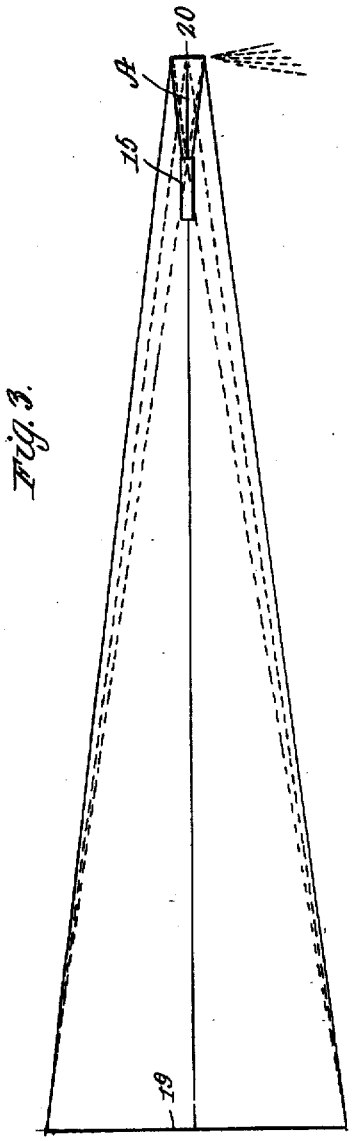
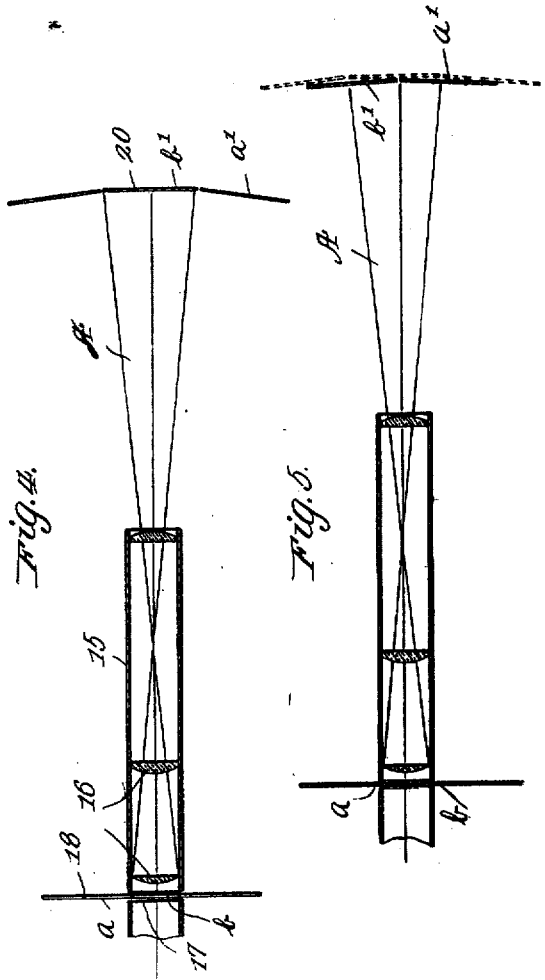

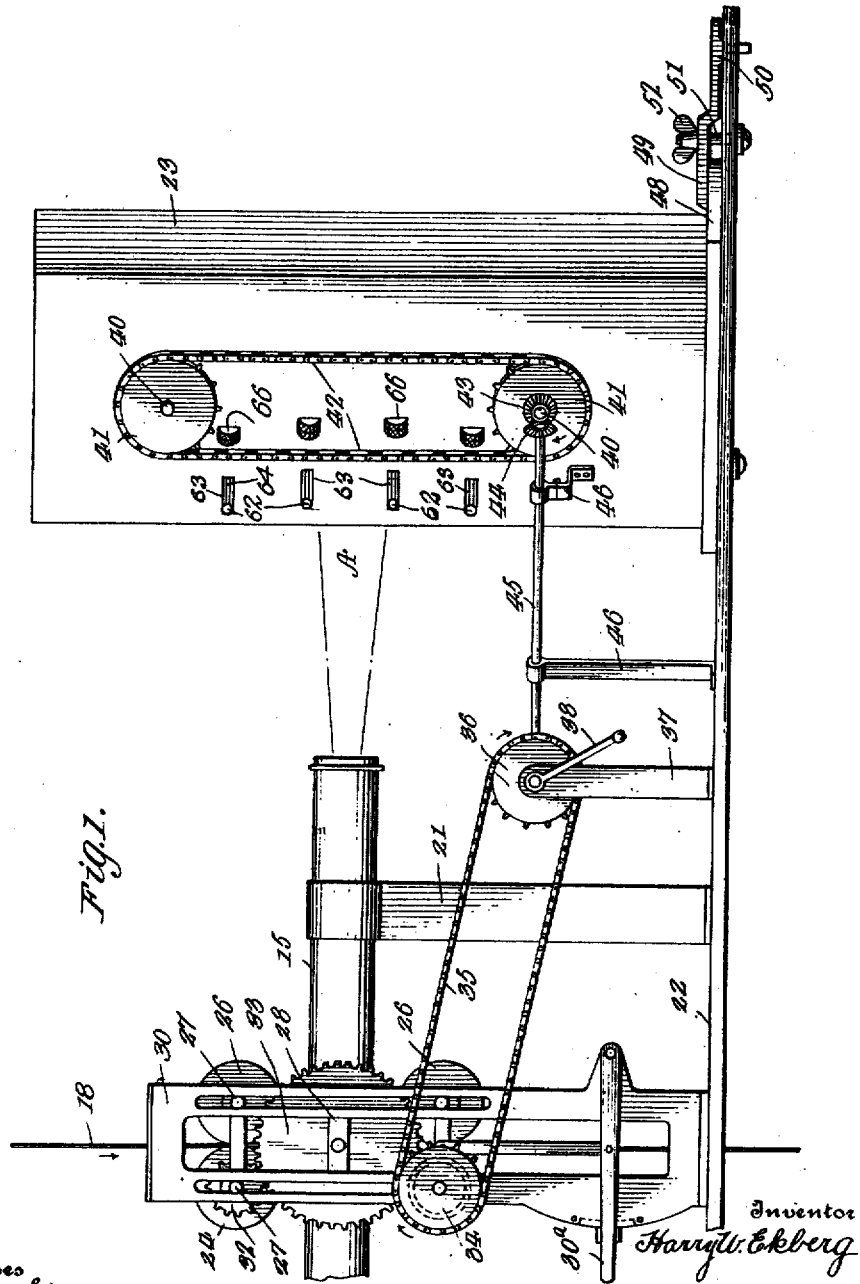

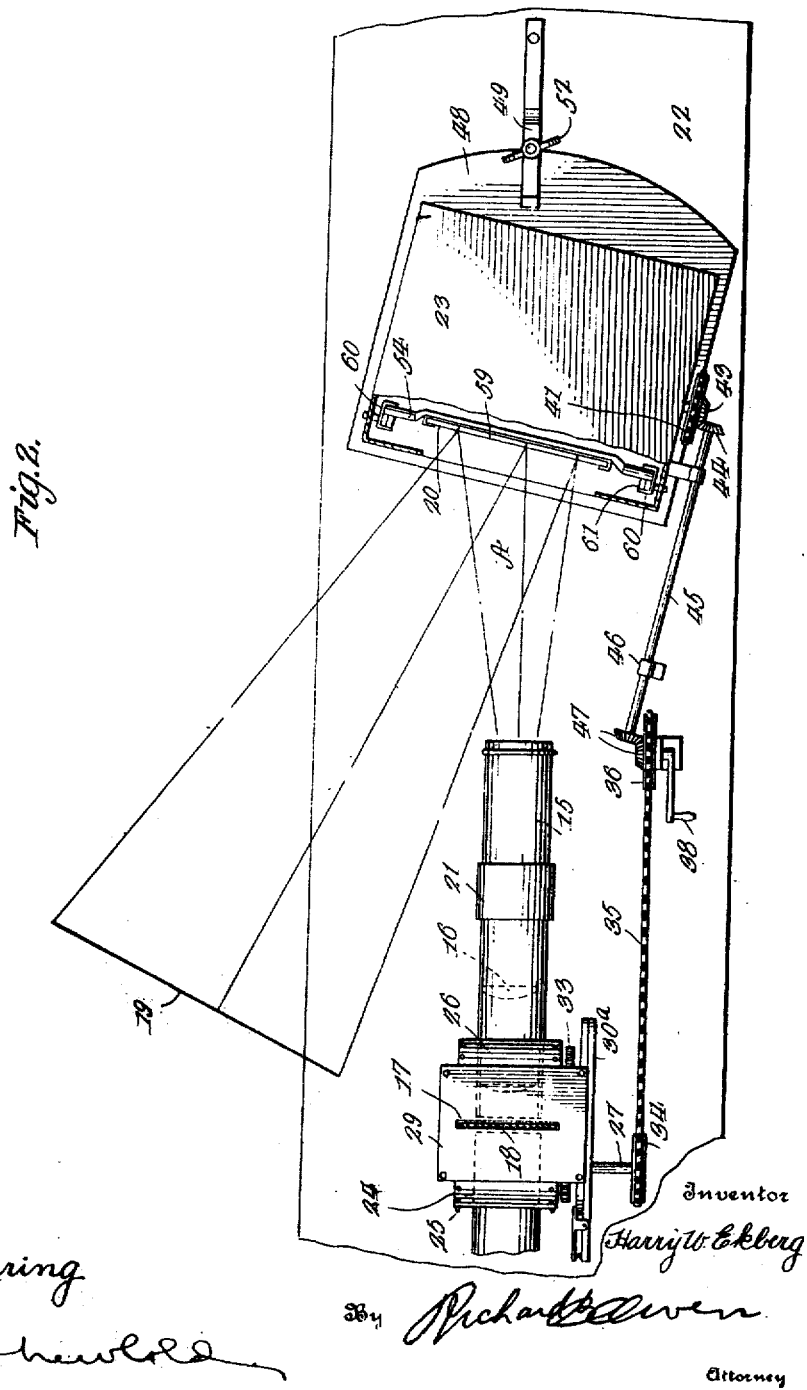

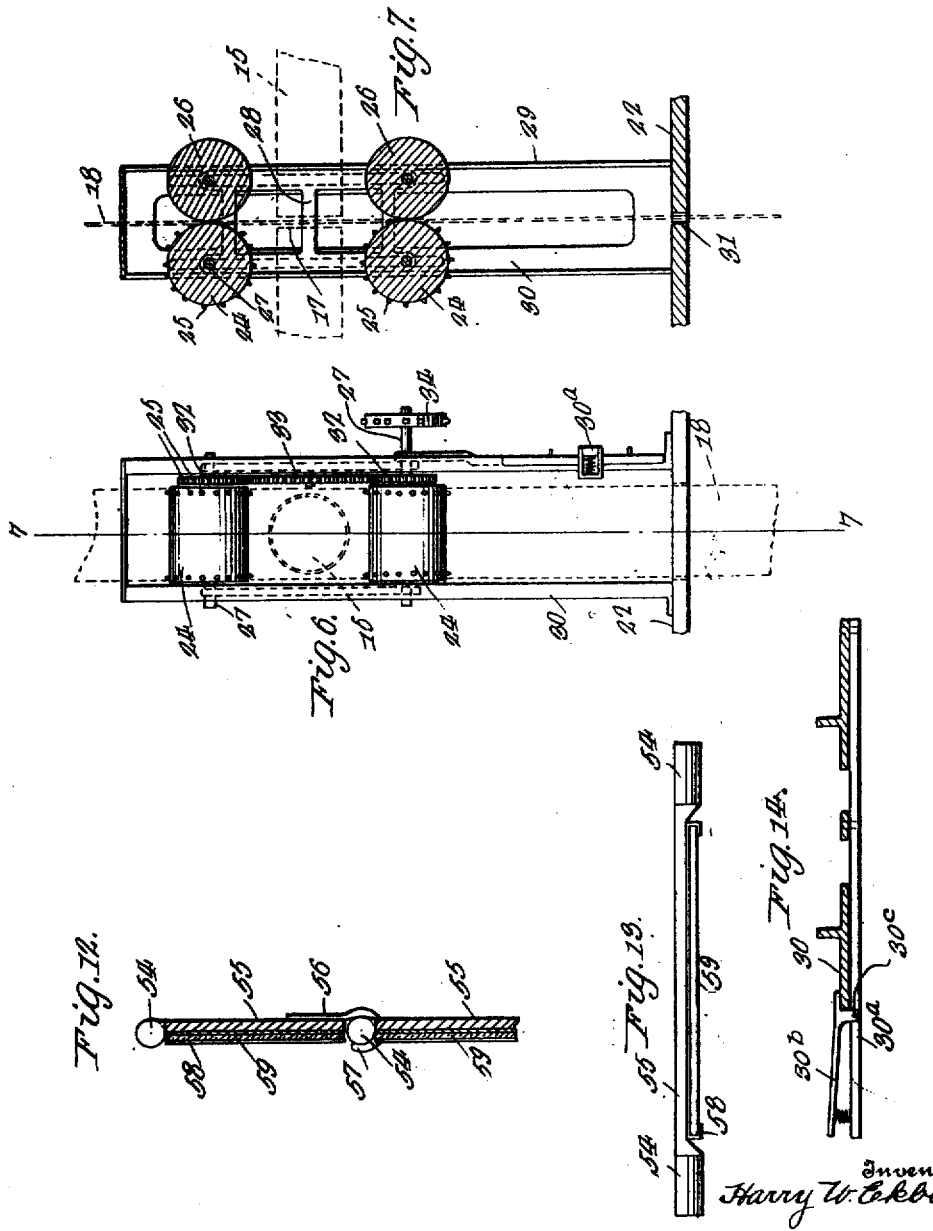

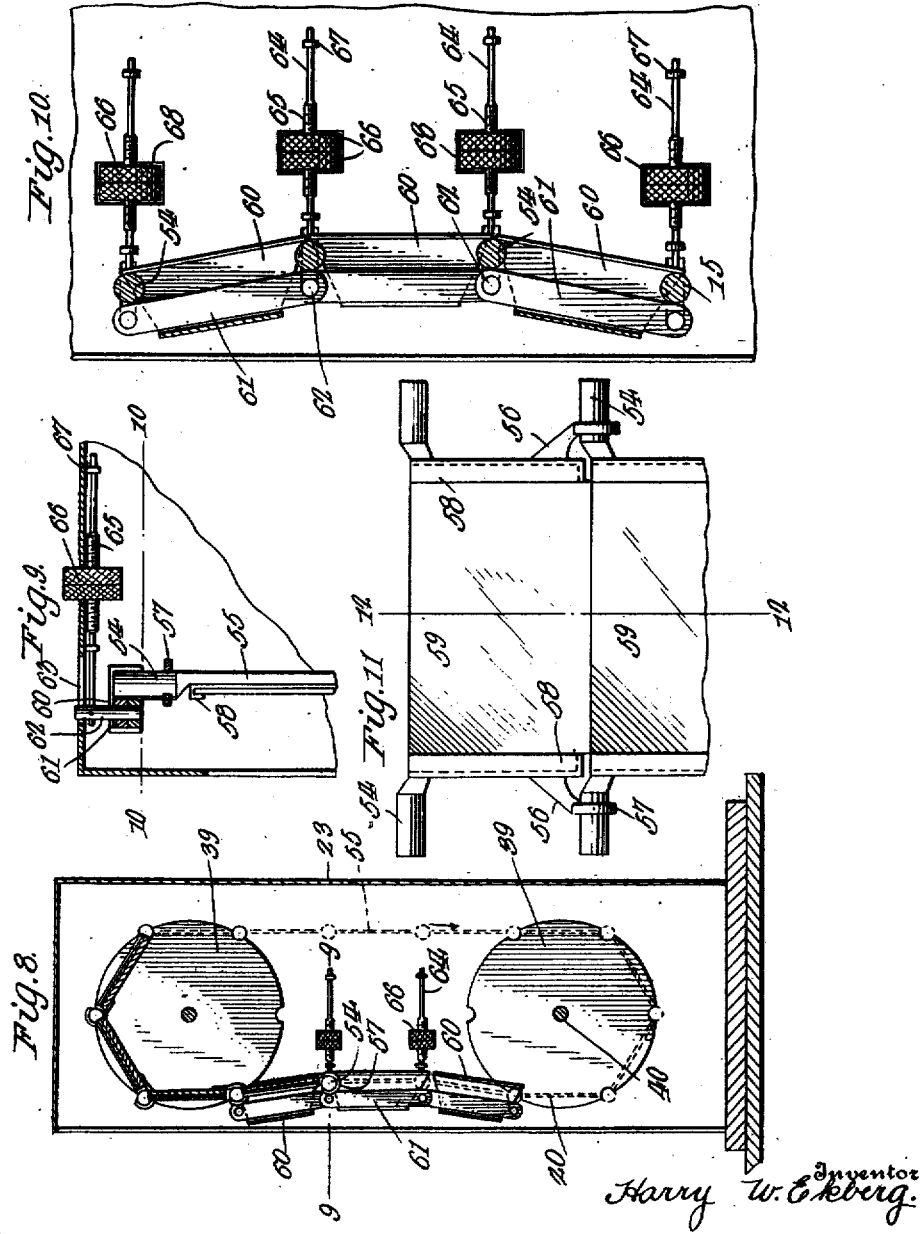

UNITED STATES PATENT OFFICE.

HARRY W. EKBERG, OF ST. PAUL, MINNESOTA.

MOTION-PICTURE-REFLECTION APPARATUS.

1,318,269.

Specification of Letters Patent.

Patented Oct. 7, 1919.

Application filed July 26, 1915. Serial No. 41,932.

*To all whom it may concern:*

Be it known that I, HARRY W. EKBERG, a citizen of the United States, residing at St. Paul, in the county of Ramsey and State of Minnesota, have invented certain new and useful Improvements in Motion-Picture-Reflection Apparatus, of which the following is a specification.

This invention relates to an apparatus for the projection and reflection of motion pictures upon a screen in such manner as to eliminate objectionable flickerings of the projected images.

As a principal object, it is contemplated by this invention to interpose a mirror chain between a projector and the screen in such manner that each picture directed upon the screen from the mirror will be removed therefrom while the following picture is being placed thereupon.

More specifically, it is an object of this invention to provide a chain of mirrors which shall be guided before a picture projector so as to approach and leave the lighted area sent out by the projector at continously changing angles, having the result of throwing the pictures upon the screen in such manner that the extremities of adjacent pictures merge, producing an effect of continuity not to be attained by the throwing of distinct and separate pictures in rapid succession upon the screen, as is now the custom.

A further object of this invention is to provide guides or channels through which the mirror members of the chain are adapted to pass so as to be forced to approach the lighted area sent out by the projector and to leave the same at fixed and predetermined angles, while also supplying means for adjusting such guides to vary the angles to suit the needs of the particular locations of the apparatus.

A still further object is to provide a driving mechanism for the mirror chain which shall be so connected to the driving mechanism for the film strip as it passes into the projector that synchronous action between successive films and successive mirrors of the chain will always be assured.

A still further aim of the invention is to provide a mirror chain including means for connecting successive mirrors in such manner as to permit of angular variation therebetween and means for rotatably mounting terminal bight portions of the chain without permitting any jerkiness to be imparted to the chain of mirrors as it passes to the lighted area and as to prevent lost motion from destroying the synchronism between the movement of the chain and that of the film strip.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:

Figure 1 is a side elevation of the apparatus of this invention as assembled in operative position with a motion picture projector, Fig. 2 is a plan view of the subject-matter of Fig. 1, Figs. 3, 4 and 5 are concerned with the diagrammatical illustration of the theory of the present invention, Fig. 6 is a rear view of the film carriage used in connection with the projector, Fig. 7 is a sectional view of Fig. 6, taken on the line 7—7 thereof, Fig. 8 is a sectional view taken through the housing for the mirror chain, Fig. 9 is a sectional view taken on the line 9—9 of Fig. 8, Fig. 10 is a view taken on the line 10—10 of Fig. 9, Fig. 11 is an enlarged elevation of two mirrors of the chain showing the linking means, Fig. 12 is a similar view but taken on the line 12—12 of Fig. 11, Fig. 13 is an edge view of one of the mirrors, and Fig. 14 is a sectional view through the carriage controlling device for the film strip.

The method at present employed in the projection of motion pictures is to pass the film strip before the projector and to throw each separate picture upon the screen as an entity, it being immediately replaced by the succeeding picture. Since the usual rate of projection is about sixteen (16) pictures a second, it will be apparent that the light upon the screen is entirely blotted out sixteen times a second and that the screen is as often alternately lit up by the projector, the rapid changes from dark to light placing the eye of the spectator under a continuous strain by the illusion of flickering of the images. This fault of the present method of projection is a well recognized annoyance.

The present invention obviates these flickerings in a novel manner which is concerned, with the provision of a steadily projected lighted area upon the screen which is accomplished by means permitting each picture to be thrown upon the screen gradually from top to bottom and to be faded therefrom in the same manner while the following picture is being thrown on. This method produces a continuous flowing effect which practical experiment has shown to be substantially free from all vestiges of the objectionable flicker above mentioned, through the reflection of a constant stream of light upon the screen.

Upon a persual of Figs. 1 and 2, it will be apparent that the basis for the present invention is the interposition of a moving chain of reflector elements between the projector and the screen, such moving chain being composed of mirrors which correspond to the separate pictures upon the film strip. The theory is more particularly set forth in Figs. 3, 4 and 5 in which the numeral 15 designates the projector tube of the usual apparatus, being provided with lenses 16 and slotted as at 17 to allow for the passage of the film strip 18. It is, of course, understood that light from a suitable source is projected through each picture which is magnified by the lenses 16 and cast upon the screen 19 after being reflected thereto by a chain of mirrors denoted 20 as an entirety. Means to be later more fully set forth are provided for permitting the separate mirrors of the chain to pass into the lighted area A synchronously with separate films of the strip 18, those mirrors which are about to enter or leave the lighted area being diverted from the vertical through continuously changing angles while the mirror positioned at the center of the area A is truly vertical, this being one of the numerous positions of the mirror in the lighted area, owing to the continuously changing angles of its inclination with respect to the film, although horizontally turned in order to reflect the images cast thereupon by the projector into the screen 19. Considering that the picture denoted $a$ is about to enter the slot 17 for projection by the apparatus, it must then be noted that the mirror $a'$ is simultaneously about to enter the lighted area A and at such an angle that the film $a$, which is inverted as is customary, will have its top refracted through the lenses 16 and reflected in an upright manner upon the screen, 19, although owing to the continuously changing inclination of the mirror the whole picture will not be at once reflected. As both film and mirror progress to the axis of the projector tube 15 more of the picture is thrown upon the screen until the position illustrated in Fig. 3 is attained by the parts, at which time the top half of the picture will be in full view upon the screen. Upon further movement of both film strip and mirror chain, with the mirror gradually and continuously changing its angle of inclination, these will assume the respective positions indicated at $b$ and $b'$ of Fig. 4, this being one point of the mirror's continual angle changing travel, showing the entire picture upon the screen and then without altering their continuity of movement, the top half of the picture will be "faded" off the screen so that the lower half only is shown when film and mirror having its angle of inclination gradually and continually changed are in the position $b$ and $b'$ of Fig. 5. Further progress of the film strip downwardly and of the chain of mirrors upwardly in the above stated conjunction with each other will fade the lower half of the picture while the top half of the succeeding picture is appearing upon the screen and this process obviously produces a steadily flowing picture upon the screen 19. It will, of course, be obvious that the rapidity of motion on the part of the film strip and of the mirrors prevents the human eye from observing that each picture is gradually exposed upon and then gradually faded from the screen while a steady flow of the character thus provided will obviate flickering of the projected images, owing to the fact that an entire picture is always displayed, although ever-changing.

The projector tube 15 is supported as is customary by a bracket arm 21 upon the base 22 and is directed not toward the screen but at some convenient angle to a casing 23 which is pivoted to the base and containing the mirror mechanism. The film strip 18 in passing downwardly through the slot 17 of the projector is given a positive movement by means of the driven disks 24 upon the extremities of which are peripherally arranged the small guide pins 25 which are adapted to engage the perforated borders of the film strip in insuring a definite movement thereof. Complementary disks 26 are associated with each of the first mentioned disks and are preferably formed with apertures to accommodate the mentioned guide pins of the first described disks 24 as the film strip passes between each pair of such rollers in the manner indicated clearly in Figs. 6 and 7. All of the disks are mounted in complimentary pairs upon shafts 27 which are journaled in the extremities of a slidable carriage, 28, the latter being engaged between edge flanges 29 of a guide structure 30 of the type illustrated, such structure being supported upon the base 22 in proximity to the projector 15, and provided with vertical slots accommodating the shafts 27 in their reciprocation as adjusted through the medium of a lever 30ᵃ which is pivoted to the structure 30 and linked to the carriage being provided with any suitable resilient detent means maintaining it in its adjusted position with respect to an adjacent edge of the carriage support. In the present instance the detent means referred to comprises a clamp plate 30ᵇ provided intermediate its ends with suitable ears adapted to be pivotally connected to the lever 30ᵃ as indicated at 30ᶜ. One end of this lever is adapted to clamp a portion of the structure 30 therebetween and the lever 30ᵃ. As more clearly shown in Figs. 1 and 14 the structure 30 is provided at its lower end with an extended portion having a curved peripheral edge and forming a substantial quadrant for the lever. The lever is engaged with one side of this quadrant and the clamping end of the clamping plate 30ᵇ is engaged with the opposite side of the same to frictionally retain the lever against movements. A suitable coiled spring interposed between the opposite end of the clamping plate and the lever serves to hold the clamping end of the plate against the quadrant or extended portion of the structure 30 with the necessary pressure. The base 22 is provided with a slot 31 to permit the passage of the film therethrough after passing through the projecting apparatus when it may be wound upon a spool in the usual way. The shafts for the disks 24 are equipped with small gears 32 which are similarly rotated through the medium of the mutually meshing gear 33, drive being imparted through a sprocket 34 mounted on the prolonged extremity of one of the shafts 27 and having trained thereover the chain or similar element 35 connecting the sprocket 34 with the primary drive sprocket 36 which is mounted in suitably positioned brackets 37 which may be manually driven through the medium of the handle 38.

The mirror chain which is more particularly illustrated in Figs. 8 to 12 inclusive is trained over guide disks 39 which are mounted upon shafts 40 journaled transversely within the casing 23. Exteriorly of this casing, these shafts carry sprocket wheels 41 which have the chain 42 trained thereover. The lowermost shaft 40 also carries the beveled pinions 43 adapted to mesh with the similar pinion 44 carried on the extremity of a transmission shaft 45, this latter being suitably supported by swivel joint brackets 46 which may be secured to both the base 22 and the casing 23 in order to support the shaft in parallelism to the latter. In a similar manner beveled pinions 47 are carried by the other extremity of the shaft 45 and by the sprocket 36 so that the drive of the latter through the medium of the handle 38 is transmitted to the mirror chain disks 39. All of the mentioned beveled pinions and all of the drive sprockets are respectively of the same size since upward progression of the mirrors must be exactly synchronous with the downward progression of the film strip 18. Any other mode of transmitting equal power to both films and mirrors may be resorted to without departing from the scope of the present invention.

The mirror casing 23 is mounted upon a laterally enlarged base 48, the rear edge of which is arcuately formed and is straddled by a clip 49 which has a slight boss 50 spacing it from the base 22 to which it is pivoted. The boss 50 permits of gripping movement on the part of the clip which may be controlled through the medium of a bolt 51 with its wing nut 52 so that the entire housing 23 may be locked in its angular position with respect to the projector and the screen. The disks 39 upon which the mirror chain is rotatable are formed with the peripheral grooves or notches 53 which accommodate the cylindrical extremities 54 of each mirror back 55. Also formed on each of these backs are a pair of outwardly inclined arms 56 formed at their extremities with hooks 57 which grip the extremities 54 of the next adjacent mirror backing so that a continuous chain is thus provided around the disks 39. On the face of each mirror back 55 are carried clips 58 which retain the mirror surfaces 59.

Since as previously explained the mirrors receiving the light rays from the projector 15 are given continually changing angular entrances and exists from the lighter area which vary from the vertical by means which positively insures a fixed path for the mirror plates 59, guide means have been provided which include the channeled clips 60, which are arranged upon opposite walls of the casing 23 in the manner illustrated in Fig. 2 to control movement of both edges of each of the mirrors. In these clips are secured the guide strips 61, such strips overlapping as illustrated and having their extremities mutually pivoted by pins 62. These latter project through slots 63 formed in the walls of the casing 23 and have secured thereto adjusting rods 64, the middle portions 65 of which are enlarged and provided with screw threads upon which are accommodated the adjusting nuts 66. Eyelet brackets 67 secured interiorly of the casing walls support the rods 64 for sliding movement while the nuts 66 project outwardly through suitable slots 68 in the casing walls to facilitate manual adjustment of the angles of the guides 60. The clips 60 have their abutting edges oppositely beveled in order to allow for angular adjustment therebetween and it will be apparent that the desired angle between the opposite inclined extreme clips and the central vertical clip may be readily attained by manipulation of the nuts 66, according to the distance through which the projected image is to be reflected by the mirror chain and according to the size of the screen employed. The mentioned cylindrical portions 54 of each mirror back are receivable snugly within the clips 60 and are slidable against the strips 61 so that a means is provided for definitely positioning the mirrors entering and leaving the lighted area in order to present and fade the pictures from top to bottom in the continuous manner set forth in the preceding.

It will be understood from the foregoing description that as the cylindrical extremities 54 travel within the channeled clips 60 and bear upon the guide strips 61, the angles of inclination of the mirrors will be continously changed with respect to the film, during the movement of each mirror through the lighted area. This is due to the fact that the channeled clips 60 are adjusted substantially in the arc of a circle and the mirrors are moving in this arc. Although Figs. 4 and 5 indicate the movement of the mirrors, it should be understood that these figures show diagrammatically only two or three of the different angles assumed by the mirrors. The position of the central mirror, for instance, in Fig. 4 which is truly vertical is only one of the different positions of the mirror since the angles of the mirror, as above stated, are continuously although gradually changed very rapidly. Therefore it will be seen that the image on the screen has the appearance of the stationary disclosure thus avoiding the usual flickering as produced by machines now in use.

From the foregoing it is believed that the operation of the present device will be so obvious as to necessitate no further discussion since the theory of the reflection has been already explained, and since mechanism has been disclosed capable of carrying out such theory and of accordingly attaining the previously presented objects.

While in the foregoing however, there has thus been illustrated in the drawings and described in the specification, such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:

1. In motion picture apparatus, a projector, linked reflecting surfaces positioned at an angle to said projector, a film strip passing through said projector, means to synchronize movement of said surfaces with said strip, means to direct each surface through an arc of reflection from top to bottom of each picture on said film, and means for varying the reflection arc.

2. In motion picture apparatus, a projector, linked reflecting surfaces positioned at an angle to said projector, a film strip passing through said projector, and bearing pictures, means to synchronize movement of said surfaces with said strip, guide means to direct each surface through an arc of reflection from top to bottom of a corresponding picture, and adjustable means operable to regulate the position of last said means.

3. In motion picture apparatus, a projector, a housing positioned at an angle to said projector, a mirror chain rotatably mounted within said housing and including linked reflecting elements, a film strip movable through said projector, means for synchronizing movement of said chain with said strip, channeled guide means secured to the walls of said housing for engagement with the edges of each element in directing the travel thereof through continually changing angles of reflection, and means for adjusting said guides for varying the said reflection angles.

4. In motion picture apparatus, a projector, a housing positioned at an angle to said projector, a mirror chain rotatably mounted within said housing and including linked reflecting elements, a film strip movable through said projector, means for synchronizing movement of said chain with said strip, bracketed rods mounting each guide, and means threaded upon each rod for adjusting said guides to vary the said reflection angles.

5. In motion picture apparatus, a projector, a housing pivotally adjustable with respect to said projector, peripherally grooved guide disks mounted in said housing, rotatable reflecting means trained over said guide disks, bearing trunnions carried by said means for engagement with the grooves of said guide disks in passing, channeled guide means mounted within said housing for reception of said trunnions for continuously changing angles of reflection, and independent means for adjusting each of said guides in varying said angles.

6. In motion picture apparatus, a projector, a housing pivotally adjustable with respect to said projector, peripherally grooved disks mounted in said housing, rotatable reflecting means trained over said guide disks, bearing trunnions carried by said means for engagement with said guide disks in passing, channeled guide means mounted within said housing for reception of said trunnions and continually changing the angles of reflection, bracketed rods supporting said guide means, and control means threadingly engaged with said rods for adjusting said guides to change the arc of reflection.

7. In motion picture apparatus, a projector, a housing pivotally adjustable with respect to said projector, reflecting means rotatably mounted within said housing, said means including mirrors, backs therefor, clips retaining said mirrors upon said backs, trunnions carried by said backs, hooks also carried thereby to removably engage said trunnions, channeled guides mounted within said housing and adapted to receive said trunnions as the mirrors rotate, guide strips pivotally connecting said guides to continuously change the reflection angles for each mirror, means for adjusting the degree of such angles, and a film strip movable through said projector and bearing pictures, each to be reflected at the said three angles.

8. In motion picture apparatus, a projector, a housing pivotally adjustable with respect to said projector, reflecting means including linked mirror elements rotatably mounted within said housing, channeled guides for directing the travel of each element, guide strips pivotally connecting said guides to determine the reflection angles for said mirrors, pivot pins for the connection of said strips and projecting through slots formed in the housing, rods bracketed to said housing, and connected to said pivot pins, means adjustably threaded upon said rods and also projecting through slots in said housing for exterior control of said guides, a film strip movable through said projector, and synchronized drive means for said strip and reflecting means in opposite directions.

9. In a motion picture apparatus, a projector, linked reflecting surfaces, a film strip passing through said projector and bearing images, means to synchronize movement of said surfaces with said strip, guide means to direct each surface through an arc of reflection in a lighted area in alinement with said projector, and adjustable means operable to regulate the position of said last mentioned means.

10. In a motion picture apparatus, a projector, a housing, a mirror chain movably mounted within said housing and including linked reflecting elements, a film strip movable through said projector, means for synchronizing movement of said chain, with said strip, channeled guide means carried by said housing, bracketed rods moving each guide means, said linked reflecting elements engaging said guide means, and means threaded upon each rod for adjusting said guide means to vary the angles of reflection.

11. In a motion picture apparatus, a projector, a housing, peripherally grooved guide disks mounted in said housing, rotatable reflecting means trained over said guide disks, bearing trunnions carried by said means for engagement with the grooved guide disks in passing, channeled guide means mounted in said housing for reception of said trunnions, for continuously changing angles of reflection and independent means for adjusting each of said guides in varying said angles.

12. In a motion picture apparatus, a projector, a housing, peripherally grooved disks mounted in said housing, rotatable reflecting means trained over said disks, bearing trunnions carried by said means for engagement with said disks in passing, channeled guide means mounted within said housing for reception of said trunnions, and continually changing the angles of reflection, bracketed rods supporting said guide means, and control means threadedly engaged with said rods for adjusting said guides to change the arc of reflection.

In testimony whereof I affix my signature in presence of two witnesses.

HARRY W. EKBERG.

Witnesses
ALFRED F. SCHNEIDER,
G. M. MUNSON.